US007441234B2

(12) United States Patent
Cwalina et al.

(10) Patent No.: US 7,441,234 B2
(45) Date of Patent: Oct. 21, 2008

(54) CORRELATING TRACE EVENTS

(75) Inventors: Krzysztof J. Cwalina, Kirkland, WA (US); Melur K. Raghuraman, Sammamish, WA (US); David D. Gutierrez, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 898 days.

(21) Appl. No.: 10/778,771

(22) Filed: Feb. 13, 2004

(65) Prior Publication Data

US 2005/0183068 A1 Aug. 18, 2005

(51) Int. Cl.
*G06F 9/44* (2006.01)
(52) U.S. Cl. ..................................................... 717/128
(58) Field of Classification Search ......... 717/128–130, 717/154; 702/186–187; 719/331; 707/10; 714/45
See application file for complete search history.

(56) References Cited

U.S. PATENT DOCUMENTS

| 5,067,073 | A | | 11/1991 | Andrews ....................... 714/38 |
| 5,442,740 | A | | 8/1995 | Parikh ......................... 345/440 |
| 6,057,839 | A | | 5/2000 | Advani et al. ................ 345/784 |
| 6,139,198 | A | | 10/2000 | Danforth et al. ............. 717/128 |
| 6,338,159 | B1 | | 1/2002 | Alexander, III et al. ...... 717/128 |
| 6,539,339 | B1 | * | 3/2003 | Berry et al. .................. 702/186 |
| 6,539,501 | B1 | | 3/2003 | Edwards ....................... 714/45 |
| 6,557,011 | B1 | | 4/2003 | Sevitsky et al. ........... 707/104.1 |
| 6,598,012 | B1 | | 7/2003 | Berry et al. .................. 702/187 |
| 6,658,416 | B1 | * | 12/2003 | Hussain et al. ................ 707/10 |
| 6,662,358 | B1 | | 12/2003 | Berry et al. .................. 717/128 |
| 6,662,362 | B1 | | 12/2003 | Arora et al. .................. 717/154 |
| 7,007,269 | B2 | * | 2/2006 | Sluiman et al. ............. 717/130 |

OTHER PUBLICATIONS

Hamou-Lhadj, Abdelwahab, et al,; "Compression Techniques to Simplify the Analysis of Large Execution Traces"; Proceedings 10th International Workshop on Program Comprehension; Jun. 27-29, 2002; Paris, France; p. 159-68.

Lencevicius, Raimondas, et al.; "Third Eye—Specification-Based Analysis of Software Execution Traces"; Proceedings of the 2000 International Conference on Software Engineering ICSE 2000 the New Millennium; Jun. 4-11, 2000; Limerick, Ireland; p. 772.

(Continued)

*Primary Examiner*—Tuan Anh Vu
(74) *Attorney, Agent, or Firm*—Workman Nydegger

(57) ABSTRACT

Methods, systems, and computer program products for correlating trace events to facilitate analysis based on how the trace events are related. Relationship information that defines relationships between logical operations is maintained within a correlation identifier stack. A correlation identifier that marks the occurrence of a logical operation is obtained for executing software and stored in the correlation identifier stack. A trace event is generated that comprises both the correlation identifier stack and an initial event payload to describe the runtime behavior of the executing software. The trace event is stored to a trace log for subsequent analysis of the executing software based on the logical operation relationship information in the correlation identifier stack and the initial correlation identifier that marks the occurrence of the logical operation. Upon obtaining an indication that the logical operation has ended, the correlation identifier is removed from the correlation identifier stack.

12 Claims, 5 Drawing Sheets

OTHER PUBLICATIONS

Rabejac, Christophe, et al.; "Executable Assertions and Timed Traces for On-Line Software Error Detection"; Proceedings of the Twenty-Sixth International Symposium on Fault-Tolerant Computing; Jun. 25-27, 1996; Sendai, Japan; p. 138-47.

Smith, Raymond, et al,; "Slicing Event Traces of Large Software Systems"; Proceedings of the Fourth International Workshop on Automated Debugging AADEBUG 2000; Aug. 28-30, 2000; Munich, Germany; p. 272-7.

Systa, Tarja; "Understanding the Behavior of Java Programs"; Proceedings Seventh Working Conference on Reverse Engineering; Nov. 23-25, 2000; Brisband, Qld., Australia; p. 214-23.

Broy, Manfred, et al. "Using Extended Event Traces to Describe Communication in Software Architectures"; Proceedings AsiaPacific Software Engineering Conference and International Computer Science Conference; Dec. 2-5, 1997; Hong Kong; p. 203-12.

Dauphin, Peter, et al.; "SIMPLE: a universal tool box for event trace analysis"; Proceedings IEEE International Computer Performance and Dependability Symposium IPDS '96; Sep. 4-6, 1996; Urbana-Champaign, IL, USA; p. 59.

Klar, Rainer; "Event-Driven Monitoring of Parallel Systems"; Performance Measurement and Visualization of Parallel Systems Proceedings of the Workshop; Oct. 23-24, 1992; Moravany, Czechoslovakia; p. 145-73.

Wybranietz, Dieter; "Measurement Techniques for Distributed Systems During Operation"; *Performance Evaluation Review;* May 1989; vol. 17, No. 1; p. 218.

\* cited by examiner

| Event Identifier ~310 | Message ~320 | Timestamp ~330 | Other Payload ~340 | Correlation Identifier Stack ~350 |
|---|---|---|---|---|
| 9A65F .... 32B78 | Start 1 | 11:56:35 | ... | A |
| 9A65F .... 32B61 | Start 2 | 11:56:36 | ... | A B |
| 9A65F .... 32B63 | End 2 | 11:56:47 | ... | A B |
| 9A65F .... 31B38 | Start 3 | 11:56:58 | ... | A C |
| 9A65F .... 31B37 | End 3 | 11:57:22 | ... | A C |
| 9A65F .... 32B79 | End 1 | 11:57:35 | ... | A |

CORRELATING TRACE EVENTS

CROSS-REFERENCE TO RELATED APPLICATIONS

N/A

BACKGROUND OF THE INVENTION

1. The Field of the Invention

The present invention relates to trace events for describing the runtime behavior of executing software. More specifically, the present invention relates to correlating one or more trace events to facilitate analysis of the one or more trace events based on how the one or more trace events are related to any other trace event.

2. Background and Related Art

In order to monitor the runtime behavior of executing software, developers often insert trace events into their source code. Trace events provide some information with respect to which instructions within the software have been or are being executed. For example, with respect to FIG. 1 (described in greater detail below), the executing software 120 includes three logical operations, labeled Logical Operation 1, Logical Operation 2, and Logical Operation 3. Each of the logical operations includes a trace event to indicate when the operation begins and a trace event to indicate when the operation ends.

This type of information regarding the runtime behavior of executing software is helpful in a variety of situations. For example, trace events can be used to help developers identify coding errors (i.e., as a debugging tool) and/or other types of software or system failures, as a support or administrator tool to help identify system problems, for generalized performance monitoring, to meter charges for software use, etc. Trace events are useful because there is often a significant amount of code that executes between display or other output, and therefore in many situations it is difficult to locate the cause of certain software failures. Furthermore, some software, such as services, may not include a significant amount (or any) display output, which, without trace events, can make narrowing the amount of code to search for errors all but impossible. Even worse, some software failures cannot be reproduced in a debugging environment because, for any number of reasons, the debugging environment masks the failure, which leaves little more than trace events as a debugging option.

For relatively simple software, rudimentary trace events, perhaps consisting of little more than a text string written to a display or a log file may be sufficient. Increasing software complexity, however, has lead to a need for increasingly sophisticated tracing. For example, note in FIG. 1 that Logical Operation 1 calls or accesses Logical Operation 2 and Logical Operation 3, which are nested within Logical Operation 1. Consider further that in many circumstances, logical operations represent reusable software components or objects. Accordingly, to the extent that developers are able to reuse software, each of the logical operations shown in FIG. 1 may be called or accessed in connection with a wide range of other logical operations, in addition to the particular arrangement illustrated in FIG. 1. In other words, analysis of Logical Operation 1, for example, should not include all trace events associated with Logical Operation 2, but rather only the trace events associated with Logical Operation 2, when Logical Operation 2 was called or accessed from Logical Operation 1.

Based on the foregoing, one level of complexity that tracing should account for is the nesting of logical operations (i.e., whether a logical operation is invoked within another logical operation). Ignoring transition events for now, the List 130 of trace events shows the sequence as: Start 1, Start 2, End 2, Start 3, End 3, and End 1. Relationships between the various trace events are based on correlation identifiers for each of the logical operations. As described in further detail below, the correlation identifiers (1, 2, and 3) for the list 130 of trace events show that Logical Operation 2 and Logical Operation 3 are nested within Logical Operation 1, and therefore should be considered during analysis of Logical Operation 1.

In practice, the number of logical operations performed during software execution is much larger than what is shown in FIG. 1 and the arrangement is significantly more complex. As a result, automated trace analysis tools have been developed to help filter trace events for those of particular interest. Determining which trace events are associated with a specified correlation identifier, however, is no trivial matter. Among other things, trace events are arbitrary, developerdefined, events, and therefore cannot always be expected to follow the relatively straightforward start and end arrangement illustrated in FIG. 1.

To help correctly associate trace events with a particular correlation identifier, transition events traditionally have been used to show the relationship between logical operations. Logical Operation 2 starts with Transition→2, indicating a transition from the previous correlation identifier to a correlation identifier of 2, and ends with Transition→1, indicating a transition back to the previous correlation identifier. Similarly, Logical Operation 3 starts with Transition→3, indicating a transition from the previous correlation identifier to a correlation identifier of 3, and ends with Transition→1, indicating a transition back to the previous correlation identifier. In this way, the filtering of trace events for Logical Operation 1 knows to include the nested operations, Logical Operation 2 and Logical Operation 3, even though the correlation identifiers may not otherwise explicitly match the filter criteria.

Transition events and maintaining accurate correlation identifiers, however, impose a fairly high degree of overhead. For example, developers are responsible for correctly adding transition events to their code. From the discussion of FIG. 1, it should be clear that inadvertently omitting a transition event can significantly change the perceived relationships between logical operations, and thereby undermine the overall effectiveness of trace events. Furthermore, trace events generally require access to correlation identifiers for parent and/or child logical operations so that transitions accurately reflect the changes in correlation identifiers when logical operations begin and end, as shown in the list 140 of correlation identifiers. In other words, downstream logical operations need to know something about upstream logical operations in order to perform transitions correctly.

Another level of complexity with respect to trace events relates to multiple threads executing the same software. For software that uses multiple threads, unrelated trace events become intermixed, making it virtually impossible for a human to explore a trace log in any meaningful way without automated filtering and analysis tools. (When multiple threads are present, at least one high-level logical operation generates distinct correlation identifiers so that trace events for the different threads can be analyzed separately and in the proper context. Distinct correlation identifiers also may be generated each time the high-level logical operation is invoked, so that trace events from different invocations that use the same thread at different times can be analyzed separately and in the proper context.) In addition to intermixing, multiple threads also tend to signal an increase in the number of trace events that are generated.

As a result, trace analysis tools have become increasingly complex in order to process the relatively sophisticated correlation identifiers being generated, thereby precluding developers from using more generalized and familiar analytical tools, such as spreadsheets or browsers. Sophisticated trace analysis tools also tend to be relatively slow because logical operations and the trace events they generate are related to each other using a post-processing analysis, based on transition events, and must be repeated each time the analysis criteria for filtering trace events changes. Accordingly, correlation identifiers that allow for analysis using more generalized and familiar analytical tools are desired.

BRIEF SUMMARY OF THE INVENTION

The present invention relates to correlating one or more trace events to facilitate analysis of the one or more trace events based on how the one or more trace events are related to any other trace event. In accordance with an example embodiment, relationship information that defines relationships between logical operations is maintained within a correlation identifier stack. An initial correlation identifier that marks the occurrence of part of all of an initial logical operation is obtained for executing software and stored in the correlation identifier stack. The example embodiment generates an initial trace event that comprises both the correlation identifier stack and an initial event payload that together describe runtime behavior for the executing software. The initial trace event is stored to a trace log for subsequent analysis of the executing software based on the logical operation relationship information in the correlation identifier stack and the initial correlation identifier that marks the occurrence of part or all of the initial logical operation.

By eliminating the need for sophisticated transition events, the correlation identifier stack simplifies the process for determining which events are related to a logical operation. As indicated above, in the past, transition events have required relatively complex and specialized tools in order to analyze trace events in their proper context. However, the correlation identifier stack allows for relating logical operations by simply determining if a particular correlation identifier is present in the stack. Accordingly, the correlation identifier stack allows for analysis of a trace log to be performed using more generalized and familiar analytical tools, such as browsers and spreadsheets.

The initial correlation identifier may mark the start of the initial logical operation. Upon obtaining an indication that the initial logical operation has ended, the initial correlation identifier may be removed from the correlation identifier stack. Prior to obtaining an indication that the initial logical operation has ended, a subsequent correlation identifier that marks the occurrence of at least part of a subsequent logical operation within the executing software may be obtained. Similar to the description above, the subsequent correlation identifier may be stored in the correlation identifier stack and a subsequent trace event with the correlation identifier stack and a subsequent trace event payload that described the runtime behavior of the executing software may be generated. The subsequent trace event may be stored in the trace log for later analysis of the executing software based on the logical operation relationship information in the correlation identifier stack and both the initial and subsequent correlation identifiers.

The trace log may be formatted in a variety of ways, including as an XML formatted list or as a comma separated list. When multiple threads execute the executing software, separate correlation identifier stacks may be maintained for each thread and used to distinguish the threads from each other. Trace event payloads may comprise a variety of data, including an event identifier, a message, a timestamp, etc.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 3 illustrates an example trace log in accordance with the present invention;

DETAILED DESCRIPTION OF THE PREFERRED EMBODIMENTS

The present invention extends to methods, systems, and computer program products for correlating trace events to facilitate analysis. The embodiments of the present invention may comprise one or more special purpose and/or one or more general purpose computers including various computer hardware, as discussed in greater detail below.

Figure 1:
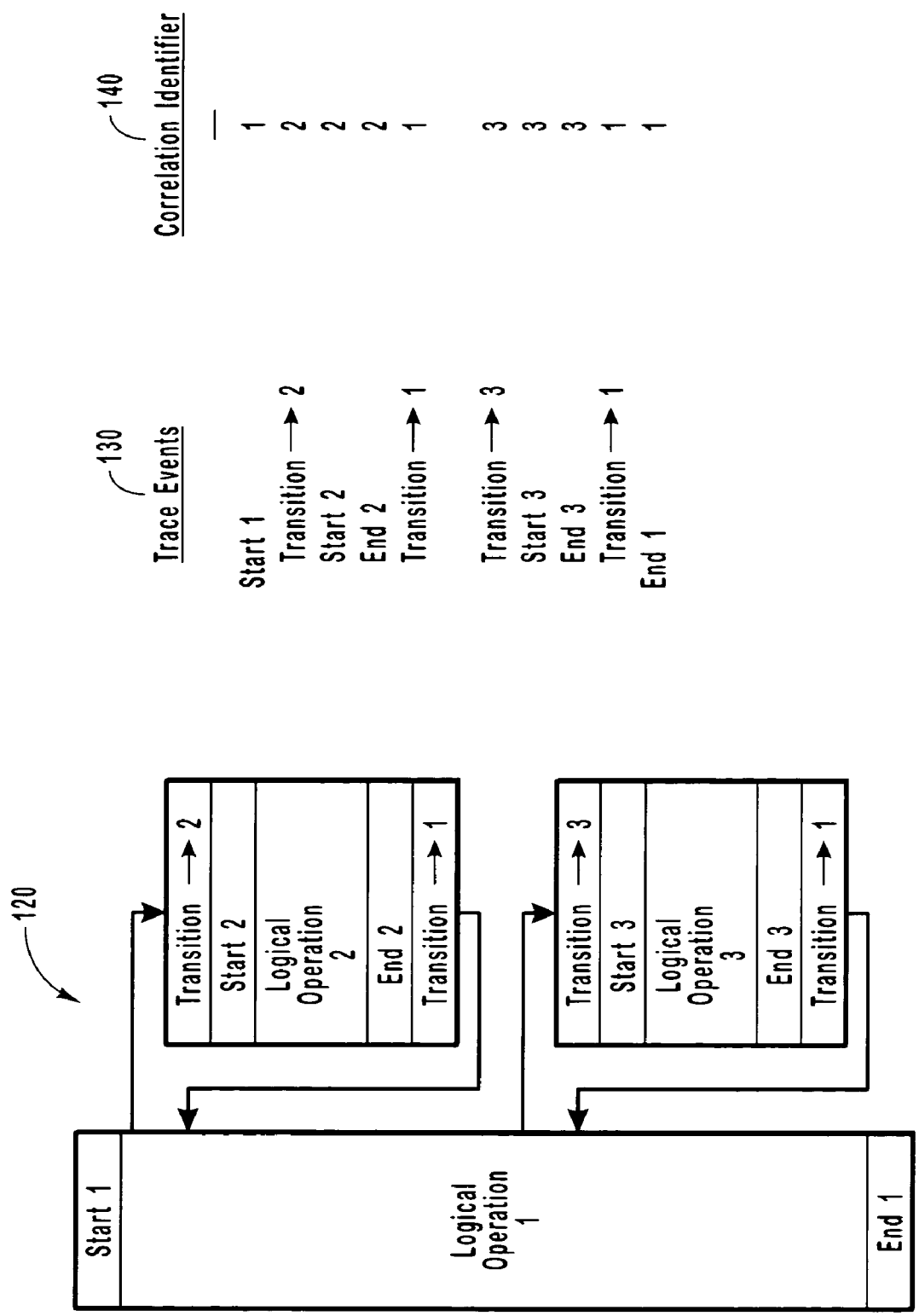
FIG. 1 illustrates the use of transitions and correlation identifiers for logical operations within executing software.
Figure 2:
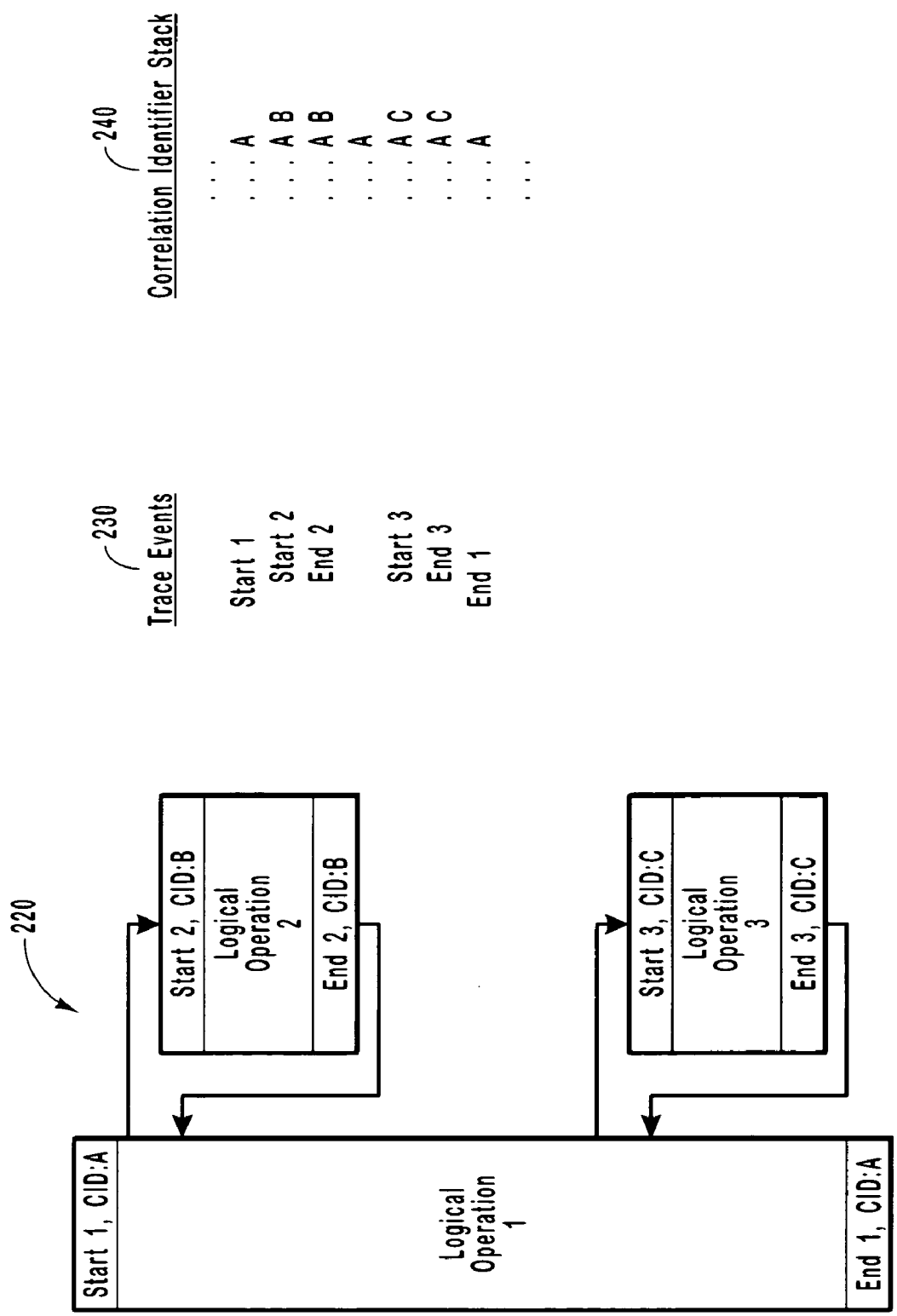
FIG. 2 shows a correlation identifier stack and trace events within executing software in accordance with the present invention.

FIG. 2 shows a Correlation Identifier Stack 240 and trace events for logical operations within Executing Software 220. Similar to FIG. 1 described above, Executing Software 220 includes Logical Operation 1, Logical Operation 2, and Logical Operation 3. Logical Operation 2 and Logical Operation 3 are nested within Logical Operation 1. Logical Operation 1 begins with trace event Start 1, which indicates that the beginning of Logical Operation 1 has been reached. Correlation Identifier A is used for correlating other logical operations and trace events with Logical Operation 1. As shown by the List 230 of trace events and Correlation Identifier Stack 240, for trace event Start 1, Correlation Identifier A is added to the correlation identifier stack. Prior to logical operation Start 1, the Correlation Identifier Stack 240 may be empty or may contain one or more other correlation identifiers, as indicated by the ellipses.

Logical operations are arbitrarily defined portions of software that a developer chooses to identify as such. A logical operation may comprise a single line or statement of code, multiple lines or statements of code, a component or routine or method, etc. Often, logical operations are nested, as shown in FIG. 2.

Where a logical operation generally corresponds to a component, routine, or method, a start event for the logical operation may occur in the immediately preceding logical operation and/or an end event for the logical operation may occur in the immediately subsequent logical operation. Of course, the start and end event may occur within the logical operation itself. For simplicity, all of the foregoing scenarios are encompassed when start and end events are described as being part of their corresponding logical operation.

The amount of tracing that is performed, although not shown as such, may be configurable, so that the amount of tracing which occurs may be adjusted as circumstance dictate. For example, with respect to FIG. 2, under normal conditions, tracing may be turned on for Logical Operation 1, and turned off for Logical Operation 2 and Logical Operation 3. (Tracing tends to be resource intensive, and therefore a default or typical level of tracing that is less than the full level of tracing that can be performed usually is desirable.) Under other circumstances, tracing also may be turned on for Logical Operation 2 and Logical Operation 3, such as during an effort to identify the location of a coding error or software failure that is known or suspected to occur sometime during the execution of Logical Operation 1. As is well-known, there are a variety of techniques for communicating configuration information to specify the level of tracing to be performed, including command line arguments, configuration files, shared registries of configuration information, parameters, and the like.

Correlation identifiers may take a variety of forms. The use of single letters reflects only a desire to simplify the description of various embodiments of the invention, but it should be appreciated that the single letters are appropriately viewed as variables which may be replaced with a wide range of values. In one embodiment, 128-bit globally unique identifiers (GUIDs) are used as correlation identifiers.

Correlation identifiers may be generated by the executing software or may depend on system calls provided or included within the operating system of a computing environment executing the software. As indicated above, correlation identifiers may change from one invocation to another or may remain constant, depending on the tracing needs for the software. For example, as described above, when multiple threads are present, at least one high-level logical operation usually generates distinct correlation identifiers so that trace events for the different threads can be analyzed separately and in the proper context. Distinct correlation identifiers also may be generated each time the high-level logical operation is invoked, so that trace events from different invocations that use the same thread (at different times) can be analyzed separately and in the proper context. In most implementations, however, trace events for different invocations can be distinguished relatively easily because the thread's stack is cleared when the thread is reused for a different invocation of the logical operation.

FIG. 3 illustrates an example Trace Log 300 in accordance with the present invention. Trace Log 300 includes various Trace Events 360 and may be formatted in a wide range of formats, including a comma separated list of trace events, an extensible Markup Language (XML) list of trace events, etc. Each trace event includes an Event Identifier 310, a Message 320, a Timestamp 330, Other Payload 340, and the contents of the Correlation Identifier Stack 350.

Correlation Identifier Stack 350 essentially eliminates the need for sophisticated transition events that, in the past, have required complex and specialized tools when analyzing trace events. For example, with Correlation Identifier Stack 350, determining which events are related to Logical Operation 1 simply requires determining if Correlation Identifier A is present in the stack. Accordingly, Correlation Identifier Stack 350 allows for analysis of Trace Log 300 to be performed using more generalized and familiar analytical tools, such as browsers and spreadsheets, which may be performed without post-processing operations that must be repeated whenever the analysis criteria changes.

Note that the event identifiers in FIG. 3 have been selected to underscore the need for the use of software tools during trace analysis. Like correlation identifiers, in one embodiment event identifiers also are 128-bit GUIDs. At times, event identifiers and correlation identifiers may differ from each other by only one bit, making manual analysis a daunting task. The trace event with a message of Start 1 was added to Trace Log 300 by Start 1 of Logical Operation 1, from FIG. 2.

While executing, Logical Operation 1 accesses or calls Logical Operation 2. Like Logical Operation 1, Logical Operation 2 begins with a start event, labeled Start 2. The correlation identifier for Logical Operation 2 is Correlation Identifier B, which is added to the Correlation Identifier Stack 240. Note that this process is different from the one described above with respect to FIG. 1. Specifically, in FIG. 2 Correlation Identifier Stack 240 has eliminated the need for transition events and the overhead associated with gaining access to parent and child correlation identifiers as well as reduced the programming effort previously consumed in accurately maintaining correlation identifiers when transitioning from one logical operation to another. For example, in some embodiments it may be possible to reduce the programming effort for a tracing event to a single method call with the correlation identifier and perhaps the stack, as parameters. Returning briefly to FIG. 3, the trace event with a message of Start 2 was added to Trace Log 300 by Start 2 of Logical Operation 2. With the addition of Correlation Identifier Stack 240, identifying related logical operations can be a relatively simple matter. If a correlation identifier under investigation appears in the stack, then the corresponding trace event should be included as part of the analysis. Accordingly, trace analysis tools can be simplified because logical operations do not need to be related to each other using a post-processing analysis based on transition events. As a result, more generalized and familiar analytical tools, such as spreadsheets, browsers, and the like, may be used to analyze trace logs.

It should be noted that the present invention may be implemented in a managed code environment, an unmanaged code environment, and/or a combination of managed and unmanaged code environment. In general, managed code refers to code that targets a runtime environment, whereas unmanaged code refers to native executable code that does not require a runtime environment. The runtime environment acts as an agent that manages code at execution time by providing core services, such as memory management, thread management, remoting, type safety, and the like. Managed code may include an execution context for software while executing that is suitable for storing the correlation identifier stack. Unmanaged code may store the correlation identifier stack in a variable that is global to the logical operations being executed, pass the correlation identifier stack as a parameter or part of a parameter, etc. It should be recognized that many techniques are available for storing the correlation identifier stack and the present invention is not necessarily limited to any particular technique.

Logical Operation 2 ends with an end event, labeled End 2, and software execution returns to Logical Operation 1. With reference to FIG. 3, the trace event with a message of End 2 was added to Trace Log 300 by End 2 of Logical Operation 2. When Logical Operation 2 ends, Correlation Identifier B is removed from Correlation Identifier Stack 240. Accordingly, as shown in FIG. 2, between the execution of Logical Operation 2 and Logical Operation 3, Correlation Identifier Stack 240 includes only Correlation Identifier A, and any correlation identifiers that were on the stack prior to execution of Logical Operation 1.

Similar to the above, while executing, Logical Operation 1 accesses or calls Logical Operation 3. Like Logical Operation 1 and Logical Operation 2, Logical Operation 3 begins with a start event, labeled Start 3. The correlation identifier for Logical Operation 3 is Correlation Identifier C, which is added to the Correlation Identifier Stack 240. Returning briefly again to FIG. 3, the trace event with a message of Start 3 was added to Trace Log 300 by Start 3 of Logical Operation 3.

Logical Operation 3 ends with an end event, labeled End 3, and once again software execution returns to Logical Operation 1. As with Logical Operation 2, when Logical Operation 3 ends, Correlation Identifier B is removed from Correlation Identifier Stack 240. Accordingly, as shown in FIG. 2, between the execution of Logical Operation 3 and the end of Logical Operation 3, Correlation Identifier Stack 240 includes only Correlation Identifier A, and any correlation identifiers that were on the stack prior to execution of Logical Operation 1. The trace event in FIG. 3 with a message of End 3 was added to Trace Log 300 by End 3 of Logical Operation 3.

Logical Operation 1 ends with an end event, labeled End 1. Similar to Logical Operation 2 and Logical Operation 3, when Logical Operation 1 ends, Correlation Identifier A is removed from Correlation Identifier Stack 240. FIG. 2 shows that after execution of Logical Operation 1, Correlation Identifier Stack 240 includes only correlation identifiers that were on the stack prior to execution of Logical Operation 1. The trace event in FIG. 3 with a message of End 1 was added to Trace Log 300 by End 1 of Logical Operation 3.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts and/or steps.

Figure 4:
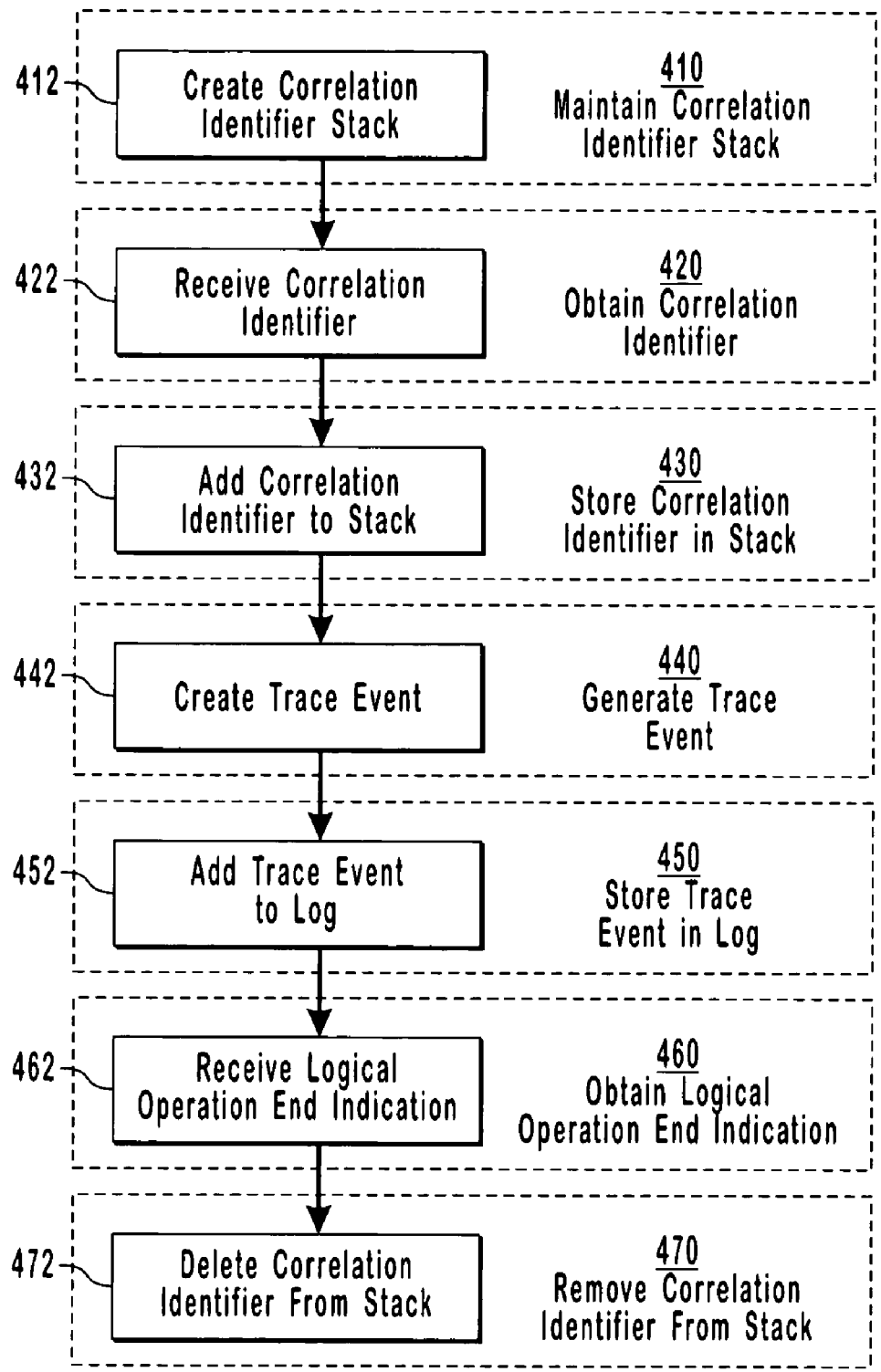
FIG. 4 shows example acts and steps for methods of correlating trace events to facilitate analysis in accordance with the present invention.

FIG. 4 shows example acts and steps for methods of correlating trace events to facilitate analysis in accordance with the present invention. A step for maintaining (410) logical operation relation information that defines relationships between logical operations with a correlation identifier stack may include an act of creating (412) a correlation identifier stack for maintaining the logical operation relationship information. A step for obtaining (420) a correlation identifier that marks the occurrence of at least part of an initial logical operation within executing software may include an act of receiving (422) the correlation identifier.

A step for storing (430) the correlation identifier to the correlation identifier stack may include an act of (432) adding the correlation identifier to the correlation identifier stack. A step for generating (440) an trace event that comprises the correlation identifier stack and a trace event payload that together describe runtime behavior of the executing software may include an act of creating (442) the trace event. A step for storing (450) the trace event to a trace log for subsequent analysis of the executing software based on the logical operation relationship information in the correlation identifier stack and the correlation identifier that marks the occurrence of at least part of the logical operation may include an act of (452) adding the initial trace event to the trace log.

A step for obtaining (460) an indication that the logical operation has ended may include an act of receiving (462) the indication. A step for removing (470) the correlation identifier from the correlation identifier stack may include an act of deleting (472) the correlation identifier from the correlation identifier stack.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Figure 5:
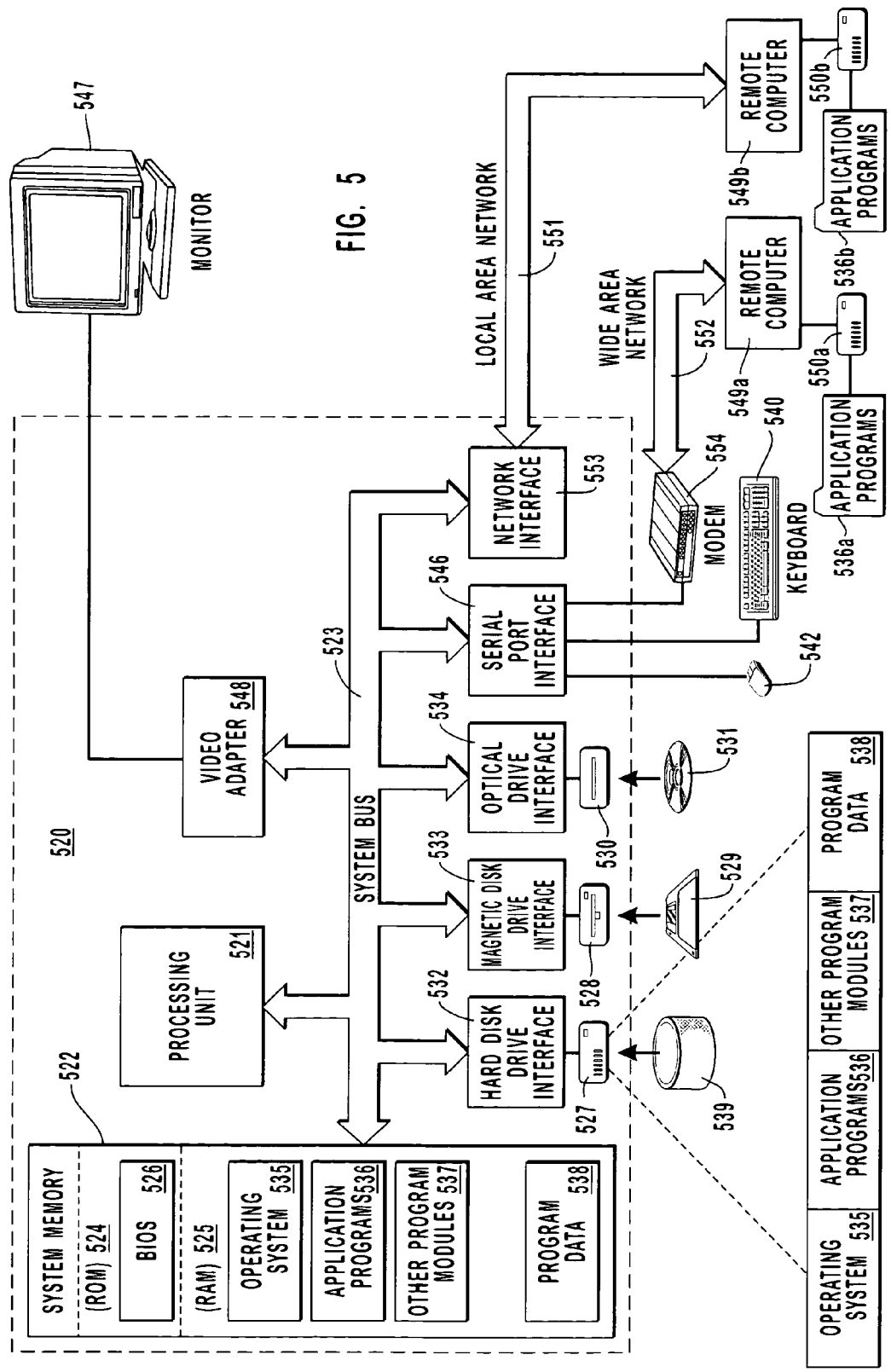
FIG. 5 illustrates an example system that provides a suitable operating environment for the present invention.

With reference to FIG. 5, an exemplary system for implementing the invention includes a general purpose computing device in the form of a conventional computer 520, including a processing unit 521, a system memory 522, and a system bus 523 that couples various system components including the system memory 522 to the processing unit 521. The system bus 523 may be any of several types of bus structures including a memory bus or memory controller, a peripheral bus, and a local bus using any of a variety of bus architectures. The system memory includes read only memory (ROM) 524 and random access memory (RAM) 525. A basic input/output system (BIOS) 526, containing the basic routines that help transfer information between elements within the computer 520, such as during start-up, may be stored in ROM 524.

The computer 520 may also include a magnetic hard disk drive 527 for reading from and writing to a magnetic hard disk 539, a magnetic disk drive 528 for reading from or writing to a removable magnetic disk 529, and an optical disc drive 530 for reading from or writing to removable optical disc 531 such as a CD-ROM or other optical media. The magnetic hard disk drive 527, magnetic disk drive 528, and optical disc drive 530 are connected to the system bus 523 by a hard disk drive interface 532, a magnetic disk drive-interface 533, and an optical drive interface 534, respectively. The drives and their associated computer-readable media provide nonvolatile storage of computer-executable instructions, data structures, program modules and other data for the computer 520. Although the exemplary environment described herein employs a magnetic hard disk 539, a removable magnetic disk 529 and a removable optical disc 531, other types of computer readable media for storing data can be used, including magnetic cassettes, flash memory cards, digital versatile discs, Bernoulli cartridges, RAMs, ROMs, and the like.

Program code means comprising one or more program modules may be stored on the magnetic hard disk 539, removable magnetic disk 529, removable optical disc 531, ROM 524 or RAM 525, including an operating system 535, one or more application programs 536, other program modules 537, and program data 538. A user may enter commands and information into the computer 520 through keyboard 540, pointing device 542, or other input devices (not shown), such as a microphone, joy stick, game pad, satellite dish, scanner, or the like. These and other input devices are often connected to the processing unit 521 through a serial port interface 546 coupled to system bus 523. Alternatively, the input devices may be connected by other interfaces, such as a parallel port, a game port or a universal serial bus (USB). A monitor 547 or another display device is also connected to system bus 523 via an interface, such as video adapter 548. In addition to the monitor, personal computers typically include other peripheral output devices (not shown), such as speakers and printers.

The computer 520 may operate in a networked environment using logical connections to one or more remote computers, such as remote computers 549a and 549b. Remote computers 549a and 549b may each be another personal computer, a server, a router, a network PC, a peer device or other common network node, and typically include many or all of the elements described above relative to the computer 520, although only memory storage devices 550a and 550b and their associated application programs 536a and 536b have been illustrated in FIG. 5. The logical connections depicted in FIG. 5 include a local area network (LAN) 551 and a wide area network (WAN) 552 that are presented here by way of example and not limitation. Such networking environments are commonplace in office-wide or enterprise-wide computer networks, intranets and the Internet.

When used in a LAN networking environment, the computer 520 is connected to the local network 551 through a network interface or adapter 553. When used in a WAN networking environment, the computer 520 may include a modem 554, a wireless link, or other means for establishing communications over the wide area network 552, such as the Internet. The modem 554, which may be internal or external, is connected to the system bus 523 via the serial port interface 546. In a networked environment, program modules depicted relative to the computer 520, or portions thereof, may be stored in the remote memory storage device. It will be appreciated that the network connections shown are exemplary and other means of establishing communications over wide area network 552 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computing system that uses trace events to describe the runtime behavior of executing software code, wherein events are included in the software code during development to track execution of one or more developer defined logical operations, wherein the logical operations are arbitrarily portions of the software that a developer chooses to observe for a tracing purpose, each of the logical operations being associated with a correlation identifier, a method of correlating, during runtime, the one or more logical operations associated with one or more trace events to facilitate analysis of the one or more trace events based on how logical operations associated with the one or more trace events are related to the logical operation associated with any other trace event, the method comprising acts of:

prior to execution of the software code:
inserting one or more events, by the developer, into the software source code to indicate points within the software code trace for subsequent analysis; and
defining logical operations within the software code: and during the execution of the software code:
creating a correlation identifier stack for maintaining correlation identifiers received within the executing software code, wherein the correlation identifiers stack comprises a hierarchy of correlation identifiers with each correlation identifier indicating a logical operation being traced at a given point in time;
creating a trace log for storing trace event information, wherein the trace log maintains trace events generated during the execution of the programs and is subsequently utilized to analyze the execution of the software code based on the logical operation relationship information indicated by the logged correlation identifier stacks and the logged event payloads, and
wherein the trace log is created by, for each occurrence of a trace event, acts comprising:

receiving either a correlation identifier that marks the occurrence of a logical operation within the executing software code, or receive an indication that the logical operation has ended within the executing software code;

if the correlation identifier is received, updating the correlation identifier stack by adding the received correlation identifier to the correlation identifier stack;

if the indication that the logical operation has ended is received, updating the correlation identifier stack by removing a correlation identifier associated with the logical operation that ended;

subsequent to updating the correlation identifier stack, generating a trace event that comprises both the correlation identifier stack and a trace event payload that describes runtime behavior of the executing software; and adding the trace event to the log.

2. A method as recited in claim 1, wherein the initial correlation identifier marks a start of the initial logical operation.

3. A method as recited in claim 1, wherein a plurality of threads execute the executing software, and wherein the method further comprises creating a separate correlation identifier stack to maintain logical operation relationship information for each of the plurality of threads.

4. A method as recited in claim 3, wherein the trace log comprises one or more trace events for each thread, and wherein the separate correlation identifier stack distinguishes each of the plurality of threads from each other.

5. A method as recited in claim 1, wherein the trace log comprises an XML formatted list of one or more trace events.

6. A computer program product as recited in claim 1, wherein the trace log comprises a comma separated list of one or more trace events, including the initial trace event.

7. For a computing system that uses trace events to describe the runtime behavior of executing software code, wherein events are included in the software code during development to track executing of one or more developer defined logical operations, wherein the logical operations are arbitrarily portions of the software that a developer chooses to observe for a tracing purpose, each of the logical operations being associated with a correlation identifier, a computer program product comprising one or more computer readable storage media storing computer executable instructions that when executed, implement a method of correlating, during runtime, the one or more logical operations associated with one or more trace events to facilitate analysis of the one or more trace events based on how logical operations associated with the one or more trace events are related to any other trace event, the method comprising acts of:

prior to execution of the software code:
  inserting one or more events, by the developer, into the software source code to indicate points within the software code to trace for subsequent analysis; and
  defining logical operations within the software code; and during the execution of the software code;
  creating a correlation identifier stack for maintaining correlation identifiers received within the executing software code, wherein the correlation identifiers stack comprises a hierarchy of correlation identifiers with each correlation identifier indication a logical operation being traced at a given point in time;
  creating a trace log for storing trace event information, wherein the trace log maintains trace events generated during the execution of the program and is subsequently utilized to analyze the execution of the software code based on the logical operation relationship information indicated by the logged correlation identifier stacks and the logged event payloads, and wherein the trace log is created by, for each occurrence of a trace event, acts comprising:
    receiving either a correlation identifier that marks the occurrence of a logical operation within the executing software code, or receiving an idication that the logical operation has ended within the executing software code;
    if the correlation identifier is received, updating the correlation identifier stack by adding the received correlation identifier to the correlation identifier stack;
    if the indication that the logical operation has ended is received, updating the correlation identifier stack by removing a correlation identifier associated with the logical operation that ended;
    subsequent to updating the correlation identifier stack, generating a trace event that comprised both the correlation identifier stack and a trace event payload that describes runtime behavior of the executing software; and
    adding the trace event to the trace log.

8. A computer program product as recited in claim 7, wherein the initial correlation identifier marks a start of the initial logical operation.

9. A computer program product as recited in claim 7, wherein a plurality of threads execute the executing software, and wherein the method further comprises creating a separate correlation identifier stack to maintain logical operation relationship information for each of the plurality of threads.

10. A computer program product as recited in claim 9, wherein the trace log comprises one or more trace events for each thread, and wherein the separate correlation identifier stack distinguishes each of the plurality of threads from each other.

11. A computer program product as recited in claim 7, wherein the trace event payload comprises an initial trace message.

12. A computer program product as recited in claim 7, wherein the trace event payload comprises a trace event identifier.

* * * * *